US012267849B2

(12) United States Patent
Amaya-Gonzalez

(10) Patent No.: US 12,267,849 B2
(45) Date of Patent: Apr. 1, 2025

(54) UPLINK TRANSMISSION ADAPTATION AFTER PHYSICAL UPLINK SHARED CHANNEL (PUSCH) MISDETECTION

(71) Applicant: DISH Wireless L.L.C., Englewood, CO (US)

(72) Inventor: Norberto Amaya-Gonzalez, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 408 days.

(21) Appl. No.: 17/903,858

(22) Filed: Sep. 6, 2022

(65) Prior Publication Data

US 2024/0040578 A1     Feb. 1, 2024

Related U.S. Application Data

(60) Provisional application No. 63/392,993, filed on Jul. 28, 2022.

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC ........................... H04W 72/1268; H04W 72/23

USPC ........................................................ 370/329
See application file for complete search history.

(56) References Cited

U.S. PATENT DOCUMENTS

| 11,792,851 | B2 * | 10/2023 | Zhang | H04W 80/02 |
| | | | | 370/329 |
| 2021/0153172 | A1 * | 5/2021 | Yerramalli | H04L 1/1864 |
| 2021/0306125 | A1 * | 9/2021 | Khoshnevisan | H04W 72/0446 |

* cited by examiner

*Primary Examiner* — Peter G Solinsky
(74) *Attorney, Agent, or Firm* — Jeremiah J. Baunach; Frontier IP Law PLLC

(57) ABSTRACT

Disclosed are systems and methods for user equipment (UE) transmission adaptation after physical uplink shared channel (PUSCH) misdetection. Instead of the cell base station (e.g., gNB) transmitting a new grant with exactly the same parameters as a first grant transmission that failed to receive a response from the user equipment (UE), the gNB transmits a new transmission with an adjusted DCI and/or an adjusted grant to increase a probability that the expected uplink (UL) transmission is received from the UE. For example, a gNB may transmit a new DCI with a new Aggregation Level (AL) indicating a new UL grant to cause one or more of: an increase in UL power spectral density (PSD) on the PUSCH; a reduction in a number of allocated resource blocks (RB); a reduction in transport block size (TBS); a reduction in a Modulation and Coding Scheme (MCS) to use for the UE transmission; and use of different redundancy versions (RV) for retransmissions.

20 Claims, 6 Drawing Sheets

UPLINK TRANSMISSION ADAPTATION AFTER PHYSICAL UPLINK SHARED CHANNEL (PUSCH) MISDETECTION

BACKGROUND

In fifth generation New Radio (5G NR) technology, when an expected uplink transmission from user equipment (UE) fails, it is important to resolve the issue efficiently to enable increased performance of the network.

BRIEF SUMMARY

A cellular (cell) base station (e.g., a gNB) in a 5G NR wireless network may transmit a downlink control information (DCI) indicating an uplink (UL) grant on a Physical Downlink Control Channel (PDCCH) to the UE. The DCI provides the UE with the necessary information such as physical layer resource allocation, Modulation and Coding Scheme (MCS), power control commands, Hybrid Automatic Repeat Request (HARQ) information for both uplink and downlink.

An UL transmission from the UE is expected by the cell base station after a DCI with an UL grant is sent to the UE. However, when the expected UL transmission from the UE fails, if the cell base station were to transmit a new grant with exactly the same parameters as the one that failed to receive a response, such subsequent transmissions would very often be unsuccessful until the call eventually fails. Thus, in an example embodiment, instead of the cell base station transmitting a new grant with exactly the same parameters as the one that failed, the cell base station sends to the UE a new adjusted DCI over PDCCH with an adjusted Aggregation Level (AL) and/or an adjusted grant to increase a probability that the expected UL transmission is successfully received from the UE.

For example, a method for requesting a new transmission from a UE with one or more adjusted parameters in response an expected UL transmission not being received from the UE may include sending, by a gNB in a 5G NR wireless network, an initial DCI using an initial AL on the PDCCH and indicating an initial UL grant to a particular UE. The gNB determines whether an expected UL transmission from the UE was received by the gNB in response to the first DCI transmission indicating the UL grant to the UE. In response to determining that the expected UL transmission from the UE was not received by the gNB, the gNB transmits a new DCI to the UE using the initial AL or an adjusted AL over PDCCH carrying the initial UL grant or a new UL grant with one or more adjusted parameters relative to the first transmission to increase the probability that the expected UL transmission from the UE is successfully received by the gNB.

Transmitting the new DCI, which carries the new UL grant, with one or more adjusted parameters relative to the first DCI may include: determining, by the gNB, whether the first DCI was successfully received by the UE, and determining, by the gNB, one or more adjusted parameters relative to the first transmission based on the determination whether the first DCI was successfully received by the UE.

Determining whether the first DCI was successfully received by the UE may include measuring, by the gNB, energy detected in a time slot and Radio Bearers (RB) during which the scheduled UL transmission is expected to be received by the gNB; performing, by the gNB, a comparison of the energy detected in the time slot and RBs to a minimum threshold level of energy associated with the expected UL transmission; and determining, by the gNB, whether the first DCI was successfully received by the UE based on the comparison of the energy detected in the time slot and RBs to the minimum threshold level of energy.

Determining one or more adjusted parameters relative to the first DCI transmission may include increasing an AL for the new DCI transmission as compared to a first DCI transmission based on a determination that the first DCI transmission was not successfully received by the UE. The gNB may then transmit the new DCI using the new AL and indicating the UL grant.

Determining one or more adjusted parameters relative to the first UL grant may include, based on a determination that the first DCI transmission was successfully received by the UE, the gNB modifying the UL grant to increase the probability of the gNB successfully decoding a new physical uplink shared channel (PUSCH) UL transmission from the UE expected in response to the new DCI transmission carrying the new UL grant. The gNB may transmit the new DCI indicating the modified UL grant to the UE.

Modifying the UL grant to increase the probability of the gNB successfully decoding the PUSCH UL transmission from the UE may include the gNB causing, by the new DCI transmission, one or more of: an increase in UL power spectral density (PSD) on the PUSCH; a reduction in a number of allocated resource blocks (RB); a reduction in transport block size (TBS); a reduction in a Modulation and Coding Scheme (MCS) to use for the UE transmission; and use of different redundancy versions (RV) for retransmissions. For example, the gNB may cause the increase in UL PSD on the PUSCH by using one or more Transmit Power Control (TPC) commands in the new DCI transmission, causing the UE to increase its transmit (Tx) power by a value.

The gNB may transmit additional DCIs to the UE in response to determining that the expected UL transmission from the UE was not received until the expected UL transmission from the UE is received. Each additional DCI transmission may cause a different one of, or a different combination of: an increase in the PDCCH AL used for the DCI transmission, an increase in UL PSD on the PUSCH; a reduction in a number of allocated RB; a reduction in TBS; a reduction in MCS to use for the UE transmission; and use of different RV for retransmissions.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
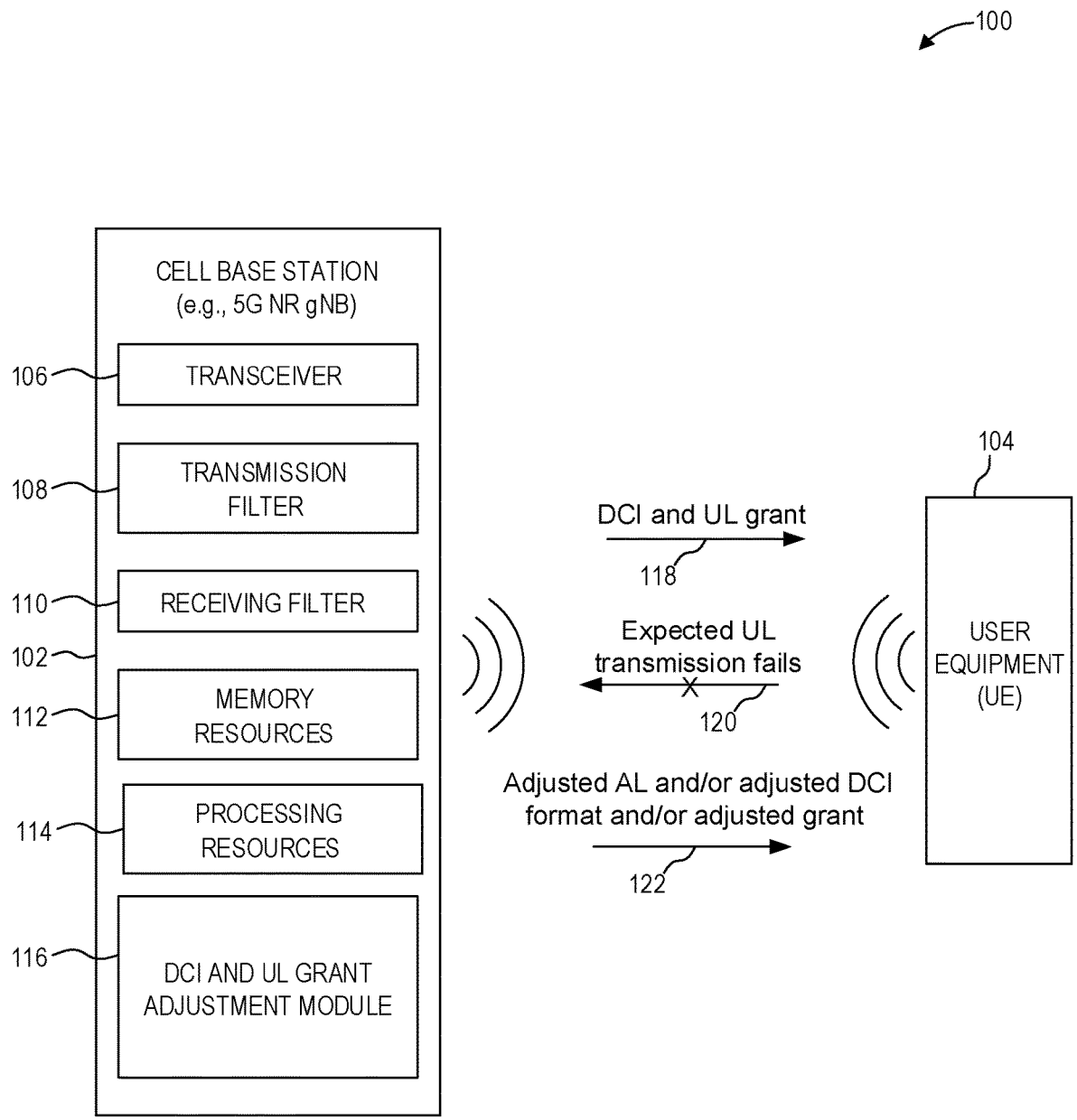
FIG. 1 is a block diagram of a wireless communication system, according to one embodiment.

FIG. 1 is a block diagram of a wireless communication system 100, according to one embodiment. The wireless communication system 100 includes a cell base station 102, which may be, for example, a fifth generation (5G) base station that uses 5G New Radio (NR) technology as specified in the 3GPP 5G Release 15 specification set, and is referred to as a gNodeB (gNB). Also shown is example user equipment (UE) 104. UE 104, for example, may be a cellular telephone, smartphone, tablet device, Internet of Things (IoT) device other cellular-enabled device, etc. The base station 102 enables the UE 104 to communicate wirelessly with other UEs or to send and receive data via the Internet.

The base station 102 includes a transceiver 106, a transmission filter 108, a receiving filter 110, memory resources 112, and processing resources 114. The transceiver 106 transmits mobile communication signals to the UE 104, to other base stations, and to other communication systems to enable mobile communication and access to the Internet. The memory resources 112 include one or more computer readable media that store software instructions for establishing a mobile communication network with the base station 102 and may also include software instructions that comprise downlink control information (DCI) and uplink (UL) grant adjustment module 116 that implements or facilitates implementation of UE transmission adaptation after physical uplink shared channel (PUSCH) misdetection as described herein. The processing resources 114 execute the instructions stored in one or more computer readable media of the memory resources 112. As set forth in more detail below, executing the software instructions, such as those of DCI and UL grant adjustment module 116, causes the base station 102 to implement UE transmission adaptation after PUSCH misdetection.

In one embodiment, the communication system 100 is a 3GPP network. The communication system 100 can include a 5G NR network. However, the communication system 100 can include other types of networks without departing from the scope of the present disclosure.

The cellular (cell) base station 102 (e.g., a gNB) in a 5G NR wireless network may transmit a first transmission 118 including DCI on a Physical Downlink Control Channel (PDCCH) and indicating a UL grant to the UE 104. 5G defines the use of the configured grant (CG) scheduling for UL transmissions that eliminates the need to request and assign resources for each packet transmission by pre-allocating resources to the UE 104. DCI provides the UE 104 with the necessary information such as physical layer resource allocation, power control commands, Hybrid Automatic Repeat Request (HARQ) information for both uplink and downlink. In 5G NR, DCI is transmitted on the PDCCH with 24-bit cyclic redundancy check (CRC) attachment. Multiple DCI formats are defined in 5G NR to meet different needs. Several of 5G NR DCI formats can share same DCI size. A cell RNTI (C-RNTI) is a unique identification used for identifying radio resource control (RRC) Connection and scheduling which is dedicated to the UE 104. The cell base station 102 (e.g., gNB) may assign different C-RNTI values to different UEs. The gNB uses C-RNTI to allocate the UE 104 with uplink grants, downlink assignments, etc. The total number of different DCI sizes configured to monitor is up to four for a cell and the total number of different DCI sizes with C-RNTI configured to monitor is up to three for a cell. Out of these three DCI sizes, one size is for scheduling downlink assignments for non-fallback format (DCI format 1_1), one size for fallback DCI formats (DCI formats 0_0 and 1_0) and the third size for uplink scheduling non-fallback format (DCI format 0_1).

Use of fallback DCI formats in general avoids uncertainties during, e.g., RRC reconfiguration in which case the network does not know the exact time when the UE has applied the configuration. Moreover, fallback DCI formats are often of less size compared to non-fallback DCI formats. The size of the non-fallback DCI format varies depending on the active configuration. DCI format 0_0 is used for uplink resource allocation (scheduling grants) for PUSCH. This is a fallback DCI format with CRC scrambled by C-RNTI or CS-RNTI or MCS-C-RNTI or Temporary C-RNTI (TC-RNTI). DCI format 0_1 is also used for uplink resource allocation (scheduling grants) for PUSCH. This is a non-fallback DCI format and its CRC can be scrambled by C-RNTI or CS-RNTI or MCS-C-RNTI or SP-CSI-RNTI.

A UL transmission response from the UE 104 to the initial DCI transmission 118 that included a UL grant is expected by the cell base station 102. However, when the expected UL transmission from the UE 104 fails 120, if the cell base station 102 were to transmit a new grant with exactly the same parameters as the one that failed to receive a response, such subsequent transmissions would very often be unsuccessful until the call eventually fails. Thus, in an example embodiment, instead of transmitting a new grant with exactly the same parameters as the one that failed, the cell base station performs a new DCI transmission with an adjusted AL and/or and adjusted DCI format and/or an adjusted grant 122 to increase a probability that the expected UL transmission is received successfully from the UE 104.

Figure 2:
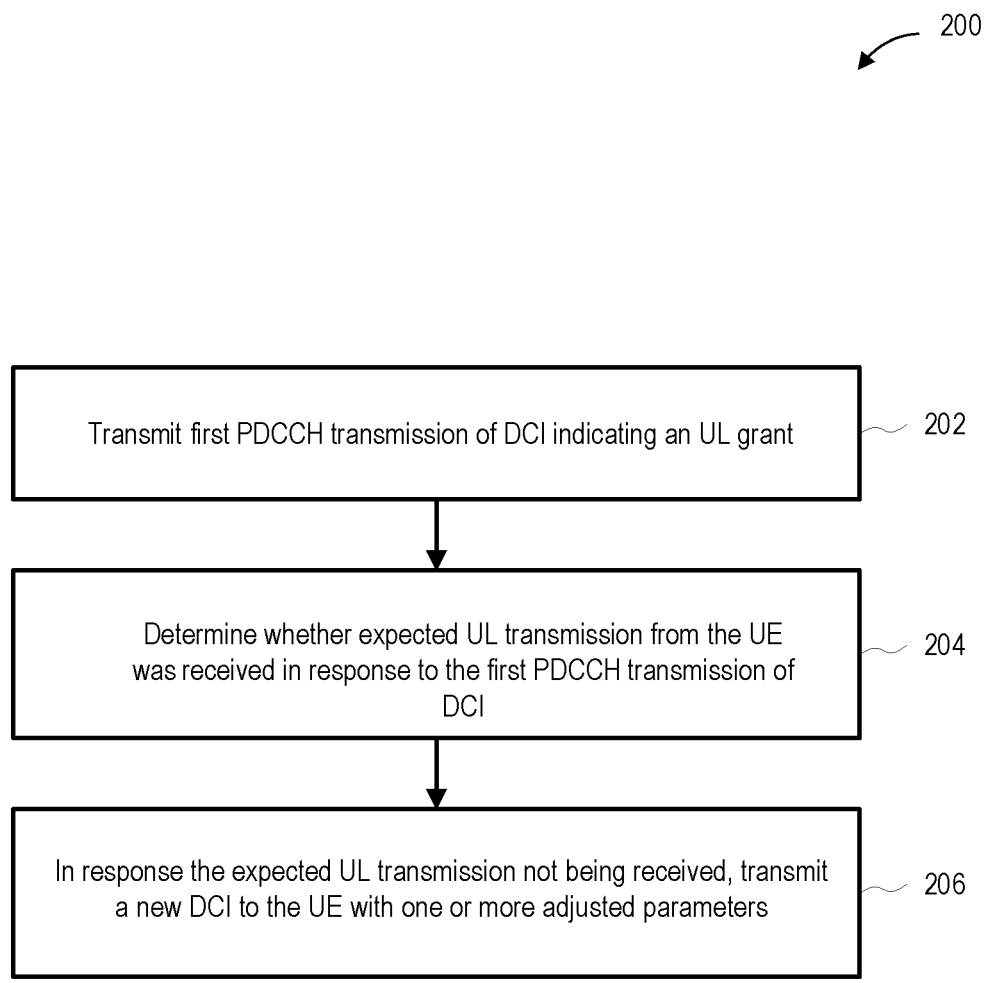
FIG. 2 is a flow diagram of a method for transmitting a new DCI to a UE with one or more adjusted parameters in response to an expected UL transmission not being received from the UE, according to one embodiment.

FIG. 2 is a flow diagram of a method 200 for transmitting a new DCI to a UE with one or more adjusted parameters in response to an expected UL transmission not being received from the UE, according to one embodiment.

At 202, a gNB (e.g., cell base station 102) in a 5G NR wireless network transmits, over a PDCCH, a first PDCCH transmission with first DCI indicating an initial uplink (UL) grant to a UE (i.e., a first DCI transmission).

At 204, the gNB determines whether an expected UL transmission from the UE was received by the gNB in response to the first PDCCH transmission of the DCI indicating the initial UL grant to the UE.

At 206, in response to determining that the expected UL transmission from the UE was not received by the gNB, the gNB transmits a new DCI to the UE with one or more adjusted parameters relative to the first DCI transmission to increase a probability that the expected UL transmission from the UE is received successfully by the gNB.

Figure 3:
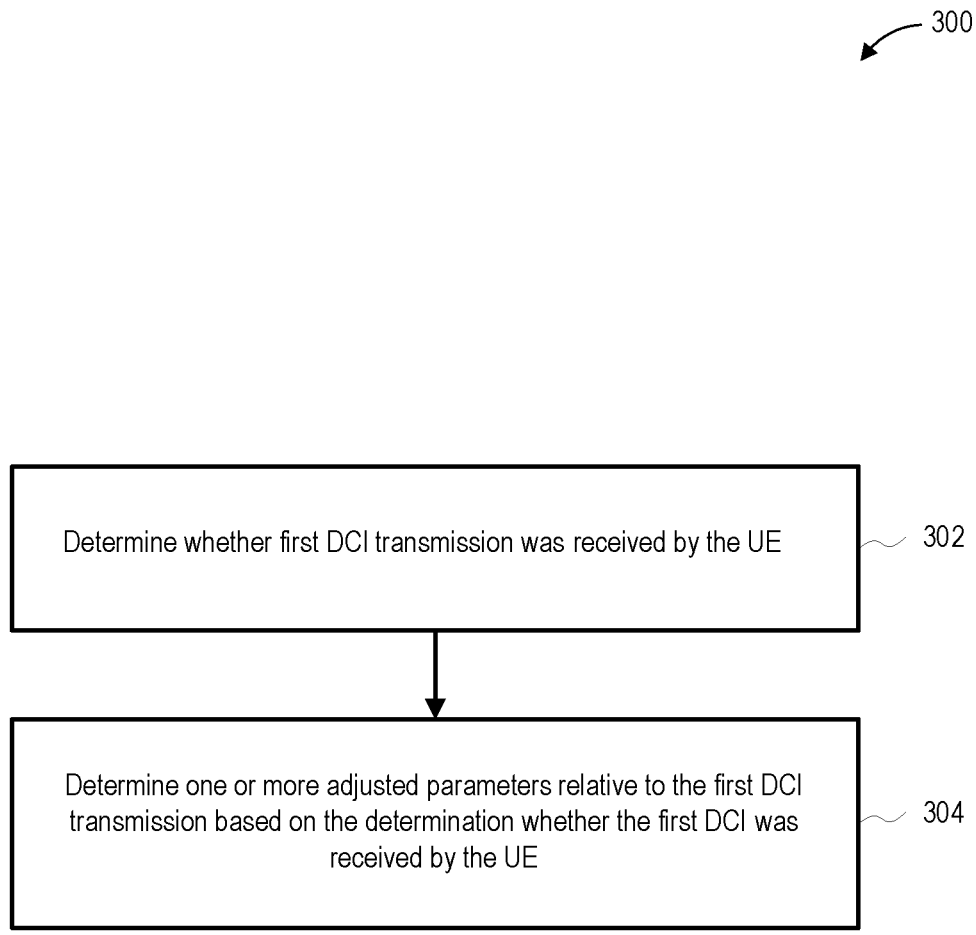
FIG. 3 is a flow diagram of a method for determining one or more adjusted parameters for a new DCI transmission over PDCCH indicating an UL grant relative to a first DCI transmission, according to one embodiment.

FIG. 3 is a flow diagram of a method 300 for determining one or more adjusted parameters for a new DCI transmission indicating a UL grant relative to a first DCI transmission, according to one embodiment.

At 302, the gNB determines whether the first DCI transmission was successfully received by the UE. For example, the determination of whether the first DCI transmission was successfully received by the UE may include measuring, by the gNB, energy detected in a time slot and RBs during which the scheduled UL transmission is expected to be received by the gNB. The gNB then performs a comparison of the energy detected in the time slot and RBs to a minimum threshold level of energy associated with the expected UL transmission. The gNB determines whether the first DCI was successfully received by the UE based on the comparison of the energy detected in the time slot and RBs to the minimum threshold level of energy. This minimum threshold level of energy could be either fixed or configurable, e.g. via parameters, in various different embodiments.

At 304, the gNB determines the one or more adjusted parameters relative to the first DCI transmission based on the determination whether the first DCI was successfully received by the UE.

Figure 4:
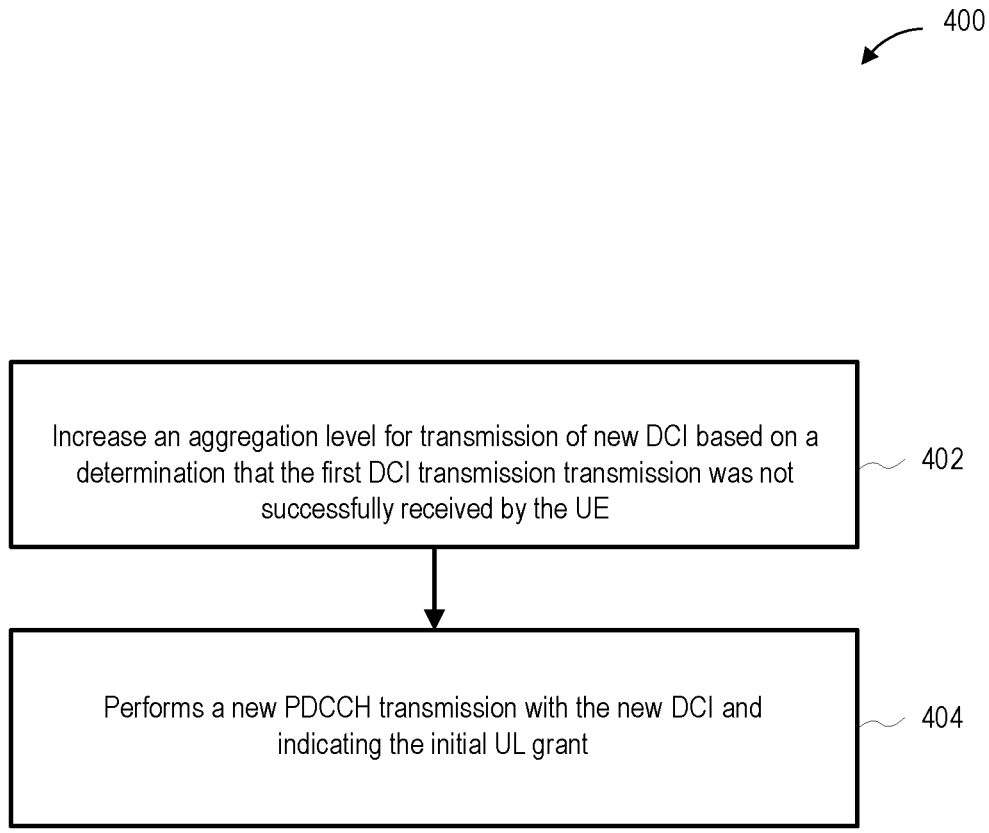
FIG. 4 is a flow diagram of a method for transmitting a new DCI to the UE with an UL grant, according to one embodiment.

FIG. 4 is a flow diagram of a method 400 for transmitting a new DCI to the UE indicating the UL grant, according to one embodiment.

At 402, in order to increase the probability that the UE will receive the new DCI, the gNB may adjust one or more parameters relative to the first DCI transmission. For instance, the gNB may increase the AL for transmission of the new DCI as compared to the AL of the first DCI included in the first transmission based on a determination that the first DCI transmission was not successfully received by the UE. The AL is the number of Control Channel Element (CCEs) used for a PDCCH candidate. Currently, possible 5G NR PDCCH Aggregation Levels (AL) are 1, 2, 4, 8, 16. A higher AL provides better coverage and is more suitable for larger cells and extreme coverage scenarios, including when the UE is physically farther from the base station, such at the edge of the cell, but at the cost of more CCEs and consequently more time-frequency resources.

At 404, the gNB performs a new PDCCH transmission with the new DCI using the new AL and indicating the UL grant.

Figure 5:
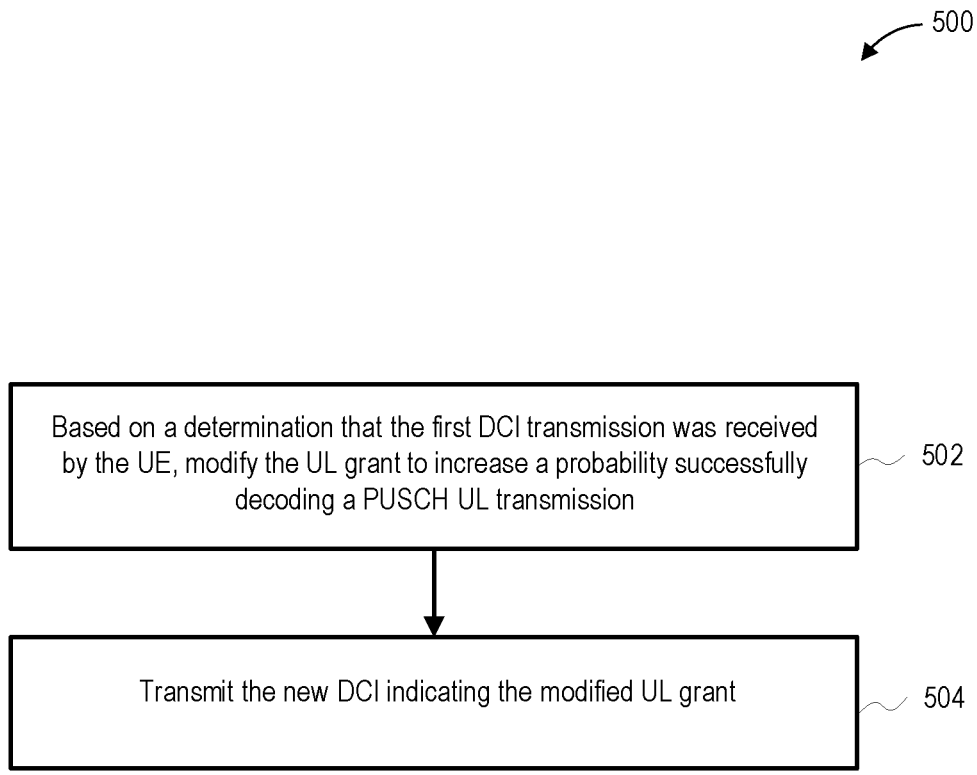
FIG. 5 is a flow diagram of a method for transmitting a new DCI to the UE indicating a modified UL grant, according to one embodiment.

FIG. 5 is a flow diagram of a method 500 for transmitting a new DCI to the UE indicating a modified UL grant, according to one embodiment.

At 502, in order to determine one or more adjusted parameters relative to the first transmission, and based on a determination that the first DCI transmission was successfully received by the UE, the gNB modifies the UL grant to increase a probability of the gNB successfully decoding a physical uplink shared channel (PUSCH) UL transmission from the UE expected in response to the new DCI transmission.

Modifying the UL grant to increase the probability of the gNB successfully decoding the PUSCH UL transmission from the UE may include the gNB causing, by indicating in the new DCI transmission, one or more of: an increase in UL power spectral density (PSD) on the PUSCH; a reduction in a number of allocated resource blocks (RB); a reduction in transport block size (TBS); a reduction in a Modulation and Coding Scheme (MCS) to use for the UE transmission; and use of different redundancy versions (RV) for retransmissions. Various other or additional actions may be performed to increase the probability of the gNB successfully decoding the PUSCH UL transmission from the UE in various embodiments.

The gNB may cause the increase in UL PSD on the PUSCH by using one or more Transmit Power Control (TPC) commands in the new DCI, thus causing the UE to increase its transmit (Tx) power by a value. The TPC command in DCI format 0_0/0_1 is used to control PUSCH transmit power. The purpose of TPC is to maintain sufficient energy-per-bit, which is driven by the quality of service (QoS) requirement of certain service, at the same time ensuring the interference is at an acceptable level. The mapping of 2 TPC bits to actual power adjustment depends on whether "accumulation" is enabled or not. In 5G NR, this is configured by RRC via tpc-Accumulation within IE PUSCH-PowerControl which is part of PUSCH-Config.

For communication technology generally, the MCS defines the numbers of useful bits which can be carried by one symbol. In 5G, one symbol on one subcarrier is defined as a Resource Element (RE) and the MCS defines how many useful bits can be transmitted per Resource Element (RE). The gNB instructs the UE to select a specific MCS table using a combination of Radio Resource Control (RRC) signaling (using information elements (IEs)) and physical layer signaling. The MCS may depend on radio signal quality in a wireless link. The better the quality, the higher the MCS and the more useful bits can be transmitted with in a Resource Element (RE). Lower signal quality results in lower MCS, which means less useful data can be transmitted with in a Resource Element (RE), but provides more robust communication for use on lower quality links.

At 504, the gNB transmits the new DCI indicating the modified UL grant to the UE.

The gNB may transmit additional DCIs with UL grants to the UE in response to determining that the expected UL transmission from the UE was not received until the expected UL transmission from the UE is received. In an example embodiment, each additional transmission causes a different one of, or a different combination of: an increase in UL power spectral density (PSD) on the PUSCH; a reduction in a number of allocated resource blocks (RB); a reduction in TBS; a reduction in MCS to use for the UE transmission; and use of different redundancy versions (RV) for retransmissions.

Figure 6:
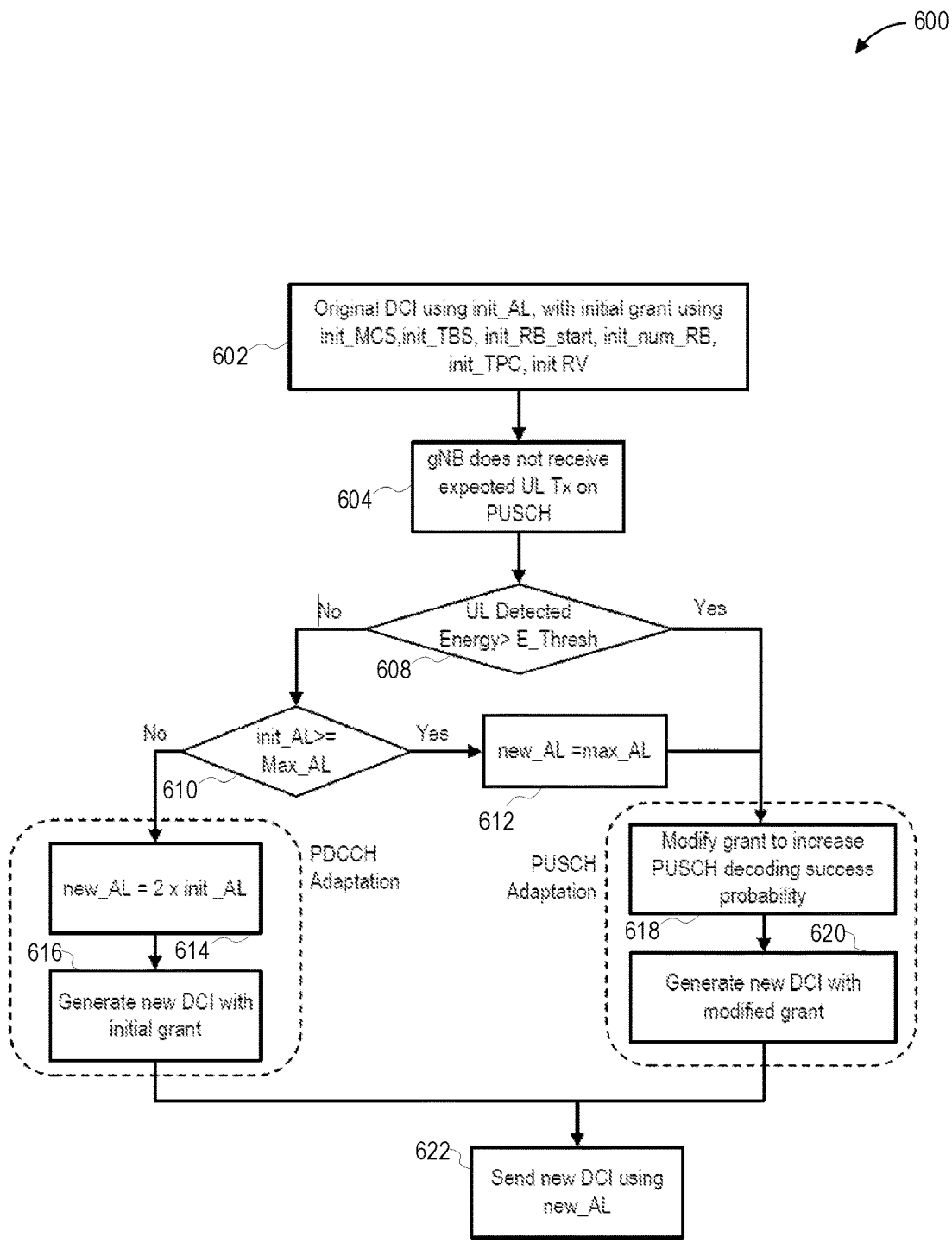
FIG. 6 is a flow diagram of an example algorithm for UE transmission adaptation after PUSCH misdetection, according to one embodiment.

FIG. 6 is a flow diagram of an example algorithm 600 for UE transmission adaptation after PUSCH misdetection, according to one embodiment. For example, the algorithm 600 may cause to be performed, implement, or be the result of, one or more of the methods of FIGS. 2 through 5. In the algorithm 600, upon UL transmission failure, the PDCCH DCI or the PUSCH grant is adjusted in order to increase the probability of successful transmission the next time it is attempted. For instance, the PDCCH AL may be increased to facilitate the successful reception of the DCI by the UE. For non-power-limited UEs, the TPC field may be used to make the UE increase its transmission power. For power limited UEs, other actions may be taken, such as using inner physical resource block (PRB) allocation, using smaller TBS and fewer number of PRBs, reducing MCS, or using different RV for retransmissions. Several parameters may be adjusted by the gNB to increase the probability of successful UL transmission, including, but not limited to, parameters indicating: AL, MCS, RB start, RB number, TBS, power control and RV.

At 602, the original DCI is transmitted to the UE using an initial Aggregation Level (init_AL) and indicating an UL grant with MCS=init_MCS, TBS=init_TBS, RB start=init_RB_start, number of RB=init_num_RB, redundancy version=init_RV, and TPC=init_TPC.

At 604, the gNB determines that the gNB did not receive an expected UL transmission on the PUSCH after sending the original DCI on the PDCCH.

At 608, the energy detected during the slot and PRBs allocated for the expected UL transmission (UL Detected Energy) is measured by the gNB and compared against a threshold, E_Thresh. If the UL Detected Energy<=E_Thresh, it is likely that the UE did not receive the DCI containing the UL grant and there was no transmission from the UE on the PUSCH. In such instances the process proceeds to 610. Otherwise, if the UL Detected Energy>E_Thresh (or if init_AL=max_AL), it is likely that the UE received the DCI containing the UL grant but the PUSCH transmission was not decoded successfully by the gNB, and thus the process proceeds to 618.

At 610, the AL (init_AL) used to send the DCI with the UL grant is compared with the maximum AL (max_AL). If init_AL=max_AL, then it is not possible to increase AL further. In this case the process proceeds to 612 where the AL is maintained at the maximum level by setting new_AL=max_AL and the process proceeds to 618. Otherwise, the process proceeds to 614.

At 614, the AL for the new DCI (new_AL) is increased, e.g., new_AL=2×init_AL.

At 616, a new DCI is generated with the initial grant parameters.

At 618, if possible the UL grant is modified in order to increase the probability of successfully decoding the PUSCH, i.e., PUSCH adaptation. In an example embodiment, PUSCH adaptation may include one or more of the following actions: increasing UL power spectral density (PSD) on PUSCH, e.g., by TPC commands indicating to the UE to increase its Tx power, if possible, by a value TPC_delta; reducing the number of allocated RB, such that new_RB_num<init_RB_num; reducing the TBS such that new_TBS<init_TBS; reducing the MCS, new_MCS<init_MCS; using different redundancy versions (RV) for retransmissions; a combination of the above. As a result of the PUSCH adaptation, different parameters are calculated for the UL grant.

At 620, a new DCI is generated with the new UL grant parameters.

At 622, the gNB sends the new DCI using the AL indicated by new_AL. The values of E_Thresh, max_AL, and TPC_delta, may be either fixed or configurable, e.g., via parameters, in various embodiments.

The embodiments described above may use synchronous or asynchronous client-server computing techniques. However, one or more of the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, cloud computing, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of system components described herein may be available by mechanisms such as through C, C++, C #, and Java application programming interfaces (APIs); a REST API (also known as a RESTful API), libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
transmitting, by a Next Generation Node B (gNB) in a fifth generation (5G) New radio (NR) wireless network, a first downlink control information (DCI) transmission indicating an initial uplink (UL) grant on a Physical Downlink Control Channel (PDCCH) to a user equipment (UE);
determining, by the gNB, whether an expected UL transmission from the UE was received by the gNB in response to the first DCI transmission indicating the UL grant to the UE; and
in response to determining that the expected UL transmission from the UE was not received by the gNB, transmitting, by the gNB, a new DCI to the UE with one or more adjusted parameters relative to the first DCI transmission and the initial UL grant to increase a probability that the expected UL transmission from the UE is successfully received by the gNB.

2. The method of claim 1 wherein the transmitting, the new DCI with one or more adjusted parameters relative to the first DCI transmission includes:
determining, by the gNB, whether the first DCI transmission was successfully received by the UE; and
determining, by the gNB, the one or more adjusted parameters relative to the first DCI transmission based on the determination whether the first DCI transmission was successfully received by the UE.

3. The method of claim 2 wherein the determining whether the first DCI transmission was successfully received by the UE includes:
measuring, by the gNB, energy detected in a time slot and resource blocks (RBs) in which a scheduled UL transmission is expected to be received by the gNB;
performing, by the gNB, a comparison of the energy detected in the time slot and RBs to a minimum threshold level of energy associated with the expected UL transmission; and
determining, by the gNB, whether the first DCI transmission was successfully received by the UE based on the comparison of the energy detected in the time slot and RBs to the minimum threshold level of energy.

4. The method of claim 2 wherein:
the determining the one or more adjusted parameters relative to the first DCI transmission includes increasing an Aggregation Level (AL) or changing a DCI format of the new DCI for a new DCI transmission as compared to the first DCI transmission based on a determination that the first DCI transmission was not successfully received by the UE; and
the transmitting the new DCI to the UE includes transmitting the new DCI and indicating the UL grant.

5. The method of claim 2 wherein:
the determining the one or more adjusted parameters relative to the first DCI transmission indicating the initial UL grant includes, based on a determination that the first DCI transmission was successfully received by the UE, the gNB modifying the initial UL grant to increase a probability of the gNB successfully decoding a physical uplink shared channel (PUSCH) UL transmission from the UE expected in response to a new DCI transmission with the new DCI; and
the transmitting the new DCI to the UE includes transmitting the new DCI indicating the modified UL grant to the UE.

6. The method of claim 5 wherein the modifying the initial UL grant to increase the probability of the gNB successfully decoding the PUSCH UL transmission from the UE includes the gNB causing, by the a new DCI transmission with the new DCI, one or more of: an increase in UL power spectral density (PSD) on the PUSCH; a reduction in a number of allocated resource blocks (RB); a reduction in transport block size (TBS); a reduction in a Modulation and Coding Scheme (MCS) to use for a UE transmission; and use of different redundancy versions (RV) for retransmissions.

7. The method of claim 6 wherein the gNB causes the increase in UL PSD on the PUSCH by using one or more Transmit Power Control (TPC) commands in the new DCI, causing the UE to increase its transmit (Tx) power by a value.

8. The method of claim 6 further comprising:
transmitting additional DCIs to the UE in response to determining that the expected UL transmission from the UE was not received until the expected UL transmission from the UE is received, each additional transmission causing a different one of: an increase in UL power spectral density (PSD) on the PUSCH; a reduction in a number of allocated resource blocks (RB); a reduction in transport block size (TBS); a reduction in a Modulation and Coding Scheme (MCS) to use for the UE transmission; and use of different redundancy versions (RV) for retransmissions.

9. A system comprising:
at least one processor; and
a memory coupled to the at least one processor, the memory storing instructions that, when executed by the at least one processor, cause the system to perform operations including:
transmitting, by a Next Generation Node B (gNB) in a fifth generation (5G) New radio (NR) wireless network, a first downlink control information (DCI) transmission indicating an initial uplink (UL) grant on a Physical Downlink Control Channel (PDCCH) to a user equipment (UE);
determining, by the gNB, whether an expected UL transmission from the UE was received by the gNB in response to the first DCI transmission indicating the initial UL grant to the UE; and
in response to determining that the expected UL transmission from the UE was not received by the gNB, transmitting, by the gNB, a new DCI to the UE with one or more adjusted parameters relative to the first transmission to increase a probability that the expected UL transmission from the UE is successfully received by the gNB.

10. The system of claim 9 wherein the transmitting the new DCI with one or more adjusted parameters relative to the first DCI transmission includes:
determining, by the gNB, whether the first DCI transmission was successfully received by the UE; and
determining, by the gNB, the one or more adjusted parameters relative to the first DCI transmission based on the determination whether the first DCI transmission was successfully received by the UE.

11. The system of claim 10 wherein the determining whether the first DCI transmission was successfully received by the UE includes:
measuring, by the gNB, energy detected in a time slot and RBs in which the scheduled UL transmission is expected to be received by the gNB;
performing, by the gNB, a comparison of the energy detected in the time slot and resource bocks RBs to a minimum threshold level of energy associated with the expected UL transmission; and
determining, by the gNB, whether the first DCI transmission was successfully received by the UE based on the comparison of the energy detected in the time slot and RBs to the minimum threshold level of energy.

12. The system of claim 10 wherein:
the determining the one or more adjusted parameters relative to the first DCI transmission includes increasing an Aggregation Level (AL) for the transmission of the new DCI as compared to an AL used for the first DCI transmission based on a determination that the first DCI transmission was not successfully received by the UE; and the transmitting the new DCI to the UE includes transmitting the new DCI with the new AL and indicating the initial UL grant.

13. The system of claim 10 wherein:
the determining the one or more adjusted parameters relative to the first DCI transmission includes, based on a determination that the first DCI was successfully received by the UE, the gNB modifying the initial UL grant to increase a probability of the gNB successfully decoding a physical uplink shared channel (PUSCH) UL transmission from the UE expected in response to a new DCI transmission with the new DCI; and
the transmitting the new DCI to the UE includes transmitting the new DCI indicating the modified UL grant to the UE.

14. The system of claim 13 wherein the modifying the UL grant to increase the probability of the gNB successfully decoding the PUSCH UL transmission from the UE includes the gNB causing, by the new DCI transmission, one or more of: an increase in UL power spectral density (PSD) on the PUSCH; a reduction in a number of allocated resource blocks (RB); a reduction in transport block size (TBS); a reduction in a Modulation and Coding Scheme (MCS) to use for a UE transmission; and use of different redundancy versions (RV) for retransmissions.

15. The system of claim 14 wherein the gNB causes the increase in UL PSD on the PUSCH by using one or more Transmit Power Control (TPC) commands in the new DCI, causing the UE to increase its transmit (Tx) power by a value.

16. The system of claim 14 wherein the operations further comprise:
transmitting additional DCIs to the UE in response to determining that the expected UL transmission from the UE was not received until the expected UL transmission from the UE is received, each additional transmission causing a different one of: an increase in UL power spectral density (PSD) on the PUSCH; a reduction in a number of allocated resource blocks (RB); a reduction in transport block size (TBS); a reduction in a Modulation and Coding Scheme (MCS) to use for the UE transmission; and use of different redundancy versions (RV) for retransmissions.

17. A non-transitory computer-readable storage medium having computer-executable instructions stored thereon that, when executed by at least one processor, cause a system to perform operations including:
transmitting, by a Next Generation Node B (gNB) in a fifth generation (5G) New radio (NR) wireless network, a first downlink control information (DCI) transmission indicating an initial uplink (UL) grant on a Physical Downlink Control Channel (PDCCH) to a user equipment (UE);
determining, by the gNB, whether an expected UL transmission from the UE was received by the gNB in response to the first DCI transmission indicating the UL grant to the UE; and
in response to determining that the expected UL transmission from the UE was not received by the gNB, transmitting, by the gNB, a new DCI to the UE with one or more adjusted parameters relative to the first DCI to increase a probability that the expected UL transmission from the UE is successfully received by the gNB.

18. The non-transitory computer-readable storage medium of claim 17 wherein the transmitting, the new DCI with one or more adjusted parameters relative to the first DCI transmission includes:
determining, by the gNB, whether the first DCI transmission was successfully received by the UE; and
determining, by the gNB, the one or more adjusted parameters relative to the first DCI transmission based on the determination whether the first DCI transmission was successfully received by the UE.

19. The non-transitory computer-readable storage medium of claim 18 wherein the determining whether the first DCI transmission was successfully received by the UE includes:
measuring, by the gNB, energy detected in a time slot and resource blocks (RBs) in which a scheduled UL transmission is expected to be received by the gNB;
performing, by the gNB, a comparison of the energy detected in the time slot and RBs to a minimum threshold level of energy associated with the expected UL transmission; and
determining, by the gNB, whether the first DCI transmission was successfully received by the UE based on the comparison of the energy detected in the time slot and RBs to the minimum threshold level of energy.

20. The non-transitory computer-readable storage medium of claim 18 wherein:
the determining the one or more adjusted parameters relative to the first DCI transmission includes increasing an Aggregation Level (AL) for the new DCI as compared to the first DCI transmission based on a determination that the first DCI transmission was not successfully received by the UE; and
the transmitting the new DCI to the UE includes transmitting the new DCI with the new AL and indicating the initial UL grant.

* * * * *